United States Patent

Lantry

[15] 3,637,269

[45] Jan. 25, 1972

[54] JOURNAL SLEEVE FOR RELATIVE ROTATION IN A BEARING

[72] Inventor: Burrell J. Lantry, Cuyahoga Falls, Ohio
[73] Assignee: Lucian Q. Moffitt, Inc., Akron, Ohio
[22] Filed: Nov. 26, 1969
[21] Appl. No.: 880,089

[52] U.S. Cl. ..................................308/237 A, 287/52.04
[51] Int. Cl. ...................................................F16c 33/78
[58] Field of Search .................308/237, 4 A, 237 A, 236; 287/52.04; 74/595

[56] References Cited

UNITED STATES PATENTS 2,506,069  5/1950  Dalton ...................................308/4 A
2,546,295  3/1951  Boice ....................................308/4 A

FOREIGN PATENTS OR APPLICATIONS 1,143,774  10/1957  France ...............................287/52.04
893,039    4/1962   Great Britain ....................287/52.04

Primary Examiner—Martin P. Schwadron
Assistant Examiner—Barry Grossman
Attorney—William Cleland

[57] ABSTRACT

Journal sleeve for a shaft, as for relative rotation of the shaft with the sleeve thereon, within a shaft bearing. Sleeve has annular chambers containing elastic rings, and means for axially compressing the rings, to expand the same radially into tight locking engagement between the shaft and opposing wall portions of the sleeve.

9 Claims, 5 Drawing Figures

PATENTED JAN 25 1972          3,637,269
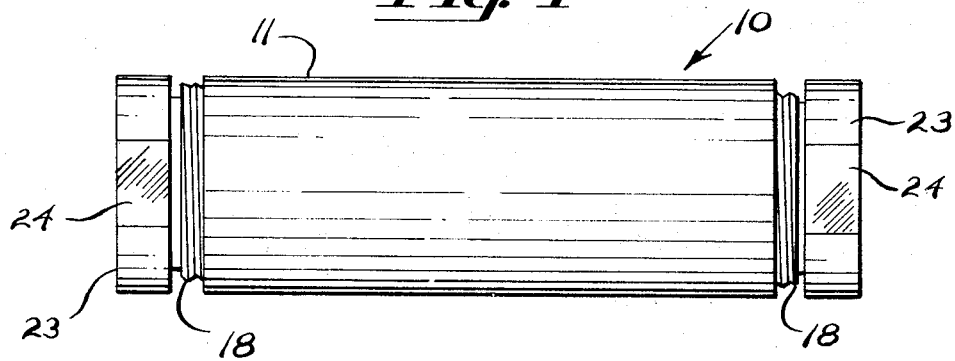
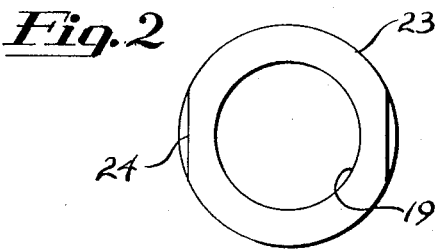 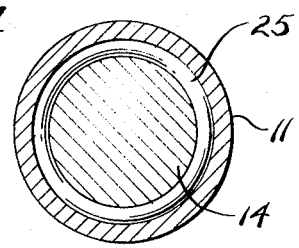
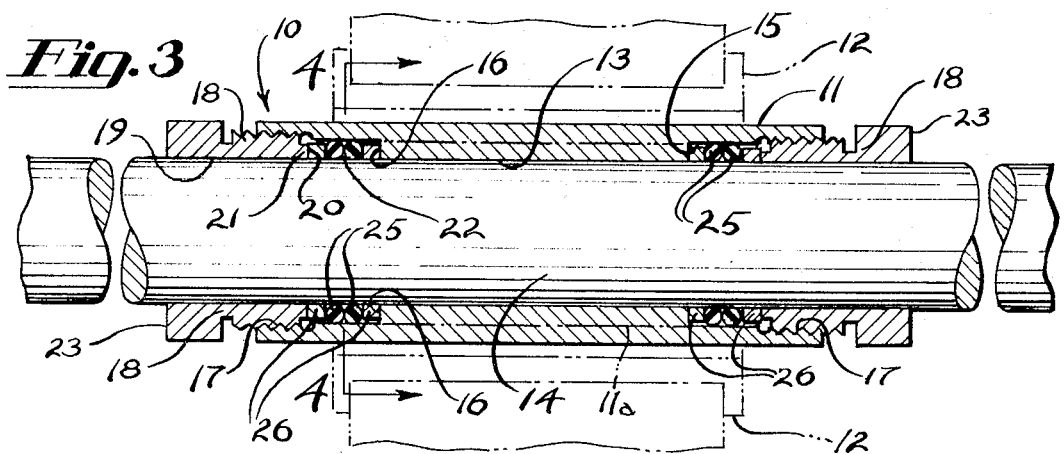
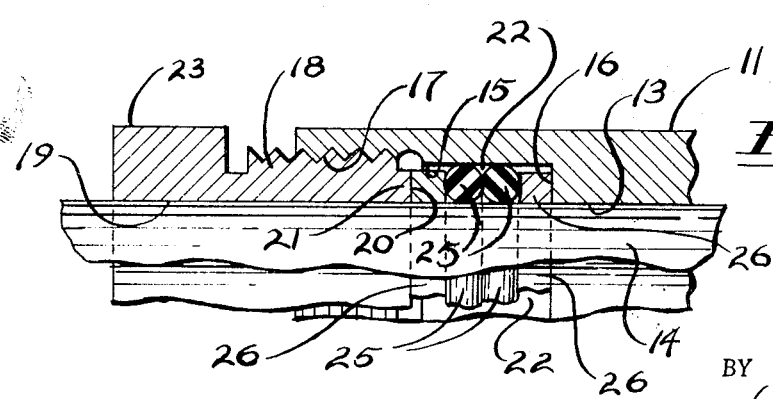
INVENTOR.
Burrell J. Lantry
BY William Cleland
Attorney

JOURNAL SLEEVE FOR RELATIVE ROTATION IN A BEARING

BACKGROUND OF INVENTION

In the past it has been common practice to provide driving or driven shafts with bearing journal sleeves of durable material to save wear and tear on the shafts. Such journal sleeves, however, were required to be shrink fitted, or press fitted, onto the shafts at considerable expense and inconvenience. Moreover such sleeves could not be removed from the shafts without being irreparably damaged.

SUMMARY OF INVENTION

This invention has for its purpose the provision of a simple, easy to install, demountable journal sleeve for relatively rotatable shafts. The sleeve of the present invention generally comprises a cylindrical tubular part having a passage through the same for axial reception of a said shaft portion. The sleeve is provided with annular bores at opposite ends thereof, within said passage and opening inwardly thereof, and has adjustment means adjustably threaded in each end for axially compressing a plurality of rubber rings, of the type referred to in the trade as O-rings to distend the same between the bore wall and a shaft portion received through the sleeve passage. With the requisite forceful adjustment of the adjustment means axially to compress the O-rings the latter are radially distended to a corresponding degree between the shaft portion and the bore wall, tenaciously to lock the sleeve against relative rotation on the shaft. The yielding axial compression applied to the rubber o-rings, moreover, serves to lock the caps in threaded connection with the sleeve, thereby to maintain the locking connection with the sleeve, thereby to maintain the locking grip of the sleeve with the shaft portion.

A general object of the present invention is to provide an improved journal sleeve of the character described, which is easy to mount, demount, or remount with regard to the locked relationship of the parts of the sleeve onto the same or different shafts, with a minimum of labor cost, and without damage to the sleeve.

Other objects of the invention will be manifest from the following brief description and the accompanying drawings:

Of the accompanying drawings:

FIG. 1 is a front elevation of a journal sleeve embodying features of the invention.

FIG. 2 is an end view of the journal sleeve as seen from either end of FIG. 1.

FIG. 3 is a vertical cross section of the sleeve shown in FIG. 1, but illustrating the same affixed on a shaft for relative rotation therewith.

FIG. 4 is a transverse cross section of the sleeve and shaft combination, as viewed in the line 4—4 of FIG. 3.

FIG. 5 is an enlarged fragmentary cross section of the upper left-hand portion of FIG. 3, illustrating the adjustable locking connection between the sleeve and shaft more clearly.

Referring to the drawings generally, and to FIGS. 1 and 2, in particular, the numeral 10 designates a sleevelike journal member having a smooth or machine finished, cylindrical outer wall 11 for relative rotation in a bearing or like support 12, as indicated in chain-dotted lines in FIG. 3, and an inner cylindrical passage 13 for sliding reception of a shaft or shaft portion 14 therethrough, as shown in full lines in FIGS. 3 and 4. The opposite ends of the sleeve member may have axially bored walls 15,15 of requisite greater diameter than the passage 13, terminating an inner stop shoulders 16,16, and communicating with internally threaded apertures 17,17.

Adjustably threaded in each threaded aperture 17 of the journal member 10 may be an externally threaded capscrew 18, having a central bore 19 for sliding reception of the shaft 18 or shaft portion 14, to present a stop shoulder 20, on a reduced portion 21 of the cap, which is adjustable with the cap to selectively axially spaced portions with reference to the respective inner shoulder 16, and defining, in the combination of the sleeve 11 with shaft 14, an annular passage or chamber 22 of rectangular cross section. Each capscrew 18 is shown provided with an integral head 23 which is at least sufficiently small in diameter and/or shape than the sleeve to permit reception of the head through the bearing 12 with the sleeve 11. Accordingly, the heads 23 may be of requisite diameter, provided with spaced flats 24,24 for engagement of a turning tool (not shown), for accomplishing said threaded adjustment of capscrew 18.

Mounted in each said annular chamber 22 may be a plurality of solid, or substantially solid, rubber or rubberlike elastic O-rings 25,25 (two being shown), each said O-ring having the small round diameters thereof approximately equal to space between shaft 14 and the cylindrical wall 15 of chamber 22 (see FIG. 5). Metal spacers 26,26 may be provided in chamber 22 to slide axially with reference to shaft 14, and to act as extensions of the spaced stop shoulders 16 and 20, as for modifying the adjustable cross-sectional size or area of the chamber 22, according to the number of O-rings required for purposes to be described. The spacers also serve to eliminate or minimize tensional stress between the O-rings and the caps 23.

In installation of the improved journal sleeve 10, either on an original or a replacement shaft 14, for relative rotation of the sleeve in a bearing 12 with the shaft (see FIG. 3), the sleeve adjustment cap and O-ring combination, as best shown in FIGS. 3 to 5 (but with the O-rings 15 in loose uncompressed or relaxed condition) is easily slidable onto the shaft 14. With the sleeve combination properly received and located on the shaft 14 generally as shown in FIG. 3, the respective capscrews are each forcibly tightened in the corresponding end of sleeve 11, until the O-rings 25,25 thereof are axially compressed by reducing the effective widths of the two chambers 22, until the O-rings are radially distended into strong locking compression between the shaft 14 and the respective chamber walls 15.

The resultant axial and radial compression of the O-rings 25 at the respective ends of the sleeve 11, in addition to locking or binding the sleeve 11 onto the shaft 14, as described, will also apply strong axial compressive force to the adjusting caps or nuts 23, to provide an effective wedging grip between the male and female threads of the caps and sleeves, and thereby lock the same together in selectively adjusted condition, as best shown in FIG. 5.

The journal sleeve as described is designed to remain locked against rotation on the shaft or shaft portion 14, through the strong grip of the compressed O-rings 25, as long as the caps 23 are not otherwise intentionally, forcibly retracted from the locking conditions thereof. By the same token, broken or otherwise damaged shafts 14, may be replaced in bearings 12 with the same journal sleeve 10 attached thereto as described. In fact, the improved journal sleeve unit 10 can easily be expected to outlast three or more such shafts in actual practice, with resultant very substantial savings in shaft replacements, when considering the fact that, previously, journal sleeves which were press fitted or shrunk onto such shafts were not capable of reuse.

Modifications of the invention may be resorted to without departing from the spirit thereof or the scope of the appended claims. For example, the sleeve 11 can be made in two parts as indicated by chain-dotted lines at 11a in FIG. 3, in which a separate inner tubular sleeve part serves as a removable spacer, of selective length according to the number of O-rings 25 required and which would then be retained centered within the main sleeve part with caps 18, O-rings 25, and the smaller spacers 26, if any are required.

What is claimed is:

1. A journal or like sleeve as for fixedly mounting on a relatively rotatable cylindrical journal portion to rotate therewith in the cylindrical opening of a bearing therefor, comprising: a member having a cylindrical outer wall for relative turning reception in the cylindrical opening of a bearing, and a passage wall extending axially therethrough for axial reception of a said journal portion within the passage; opposite ends of said member having recess portions defining cylindrical recess walls each adapted to be radially outwardly spaced with reference to a journal portion received within said passage wall thereof; each said recess portion having at least one rubberlike elastic ring retained therein for resilient radial distention between said recess wall and a said journal portion received within said passage wall; and adjustment means on each of said opposite ends of said member, selectively adjustable to reduce the axial extent of the respective said recess portion and apply confining axial compression to the at least one elastic ring therein, yieldingly radially to distend the same into compressive bonding grip thereof between the corresponding recess wall and said journal portion, for locking the member against relative rotation on the journal portion, at least one said adjustment means being proportioned with reference to said outer wall of said member to permit unobstructed endwise reception of the adjustment means and the member axially within the cylindrical opening of said bearing.

2. A journal or like sleeve as set forth in claim 1, each said adjustment means including a cap in screw connection with the corresponding end of said member, and axially spaced stop means on the cap and said member, whereby inward threaded adjustment of the cap in said member is adjustably operable for applying said resilient axial distension of said at least one elastic ring by compression thereof between said stop portions.

3. A journal or like sleeve as in claim 2, each said recessed portion having a plurality of said elastic rings thereon for said yielding axial compression thereof between said stop means.

4. A journal or like sleeve as in claim 1, each said recessed portion having a plurality of said elastic rings therein in the form of rubber O-rings.

5. A journal or like sleeve as in claim 1, each said cap having means thereof to facilitate threaded adjustment of the same on said member.

6. A journal or like sleeve as in claim 1, said stop means of each said recessed portion including provision of an annular spacer between the inner end of said adjustment means and a next adjacent said elastic ring for slidable contact with said inner end for minimizing torsional distortion of said next adjacent elastic ring upon adjustment of said adjustment means.

7. A journal or like sleeve as in claim 1, said stop means of each said recessed portion including provision of annular spacers between said at least one elastic ring and the ends of said axial extent of the recess portion.

8. A journal or like sleeve as for fixedly mounting on a relatively rotatable cylindrical journal portion to rotate therewith in the cylindrical opening of a bearing therefor, comprising: a member having a cylindrical outer wall for relative turning reception in the cylindrical opening of a bearing, and a passage wall extending axially therethrough for axial reception of a said journal portion within the passage; opposite ends of said member having recess portions defining cylindrical recess walls each adapted to be radially outwardly spaced with reference to a journal portion received within said passage wall thereof; each said recess portion having at least one rubberlike elastic ring retained therein for resilient radial distension between said recess wall and a said journal portion received within said passage wall; and adjustment means on each of said opposite ends of said member, selectively adjustable to reduce the axial extent of the respective said recess portion and apply confining axial compression to the at least one elastic ring therein, yieldingly radially to distend the same into compressive bonding grip thereof between the corresponding recess wall and said journal portion, for locking the member against relative rotation on the journal portion; said adjustment means being proportioned with reference to said outer wall of said member to permit unobstructed endwise reception of the adjustment means and the member axially within the cylindrical opening of said bearing; each said adjustment means including a cap in screw connection with the corresponding end of said member, and axially spaced stop means on the cap and said member, whereby inward threaded adjustment of the cap in said member is adjustably operable for applying said resilient axial distension of said at least one elastic ring by compression thereof between said stop portions; each said recessed portion having a plurality of said elastic rings thereon for said yielding axial compression thereof between said stop means; said stop portions of each said recessed portion including spacers between which the elastic rings are engageable, and which are relatively movable together by said threaded adjustment of said cap to grip said elastic rings therebetween.

9. A journal or like sleeve as in claim 8, said caps having means thereon to facilitate threaded adjustment of the same in said member.

* * * * *